(12) United States Patent
Bowra et al.

(10) Patent No.: US 7,664,856 B2
(45) Date of Patent: Feb. 16, 2010

(54) DYNAMICALLY BALANCING USER EXPERIENCES IN A MULTI-USER COMPUTING SYSTEM

(75) Inventors: Todd Bowra, Redmond, WA (US); Jeffrey Davis, Snohomish, WA (US); Gurpratap Virdi, Bellevue, WA (US); Nicholas Fang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 11/191,786

(22) Filed: Jul. 28, 2005

(65) Prior Publication Data
US 2007/0027983 A1 Feb. 1, 2007

(51) Int. Cl.
*G06F 15/173* (2006.01)

(52) U.S. Cl. ............... 709/225; 709/223; 709/224; 709/226; 709/232; 709/235

(58) Field of Classification Search ......... 709/223–224, 709/231–235
See application file for complete search history.

(56) References Cited

U.S. PATENT DOCUMENTS

| | | | |
|---|---|---|---|
| 6,993,681 B2 * | 1/2006 | Haynes et al. ............... 714/23 |
| 7,124,188 B2 * | 10/2006 | Mangipudi et al. ........... 709/226 |
| 2002/0140851 A1 * | 10/2002 | Laksono ................... 348/388.1 |
| 2003/0236854 A1 * | 12/2003 | Rom et al. .................... 709/217 |
| 2004/0261081 A1 * | 12/2004 | Sen .............................. 719/313 |
| 2005/0008074 A1 * | 1/2005 | van Beek et al. ........ 375/240.01 |
| 2005/0262258 A1 * | 11/2005 | Kohno et al. ................. 709/231 |
| 2006/0080707 A1 * | 4/2006 | Laksono ....................... 725/38 |
| 2006/0136927 A1 * | 6/2006 | Covell et al. ................ 718/105 |

* cited by examiner

*Primary Examiner*—Shawki S Ismail
(74) *Attorney, Agent, or Firm*—Lee & Hayes, PLLC

(57) ABSTRACT

A media experience policy engine includes three components: an information manager, a policy evaluator, and an enforcement module. The information manager collects information regarding the current state of a media delivery system, such as, for example, usage of a CPU, memory, hard disk, (I/O) interface, and a network. This collected data is then verified by the policy evaluator to see if resource contention is, or is close to, occurring. If so, existing or potential conflicts are dealt with by the enforcement module, which applies corrections, such as, for example, limiting the access of later chronologic users, or degrading the user experience of all users, in accordance with a desired policy in order to vitiate the resource contention and maintain a user experience consistent with the desired policy.

11 Claims, 6 Drawing Sheets

DYNAMICALLY BALANCING USER EXPERIENCES IN A MULTI-USER COMPUTING SYSTEM

BACKGROUND

As the personal computer (PC) moves to become the center of the digital home, it must simultaneously handle requests from an ever-increasing number of devices wishing to access media content (music, pictures, videos, TV, etc.) stored on the PC.

For example, a user can currently employ a PC as an entertainment server to deliver media and other content over a network to client devices such as desktop PCs, notebooks, portable computers, cellular telephones, other wireless communications devices, personal digital assistants (PDA), gaming consoles, IP set-top boxes, handheld PCs, and so on. Content capable of being delivered includes pictures, audio content, audio/video (AV) content, and computer readable programs which may be introduced to the entertainment server on portable storage media, such as CDs or DVDs, or via a tuner receiving the content from remote sources, such as the Internet, a cable connection, or a satellite feed.

Software, such as the WINDOWS XP® Media Center Edition operating system marketed by the Microsoft Corporation of Redmond, Wash., has greatly reduced the effort and cost required to transform normal home PCs into hosts capable of delivering such content. At some point, however, the resources required to deliver content to the various devices requesting it may exceed the resources available on the PC. When this happens, unexpected and/or undesirable behavior may result in disruptions experienced on the PC and/or the device accessing the content from the PC.

Thus, there exists a need to enable a PC to function in a multi-user environment and to deliver content to a multitude of requesting devices without exceeding the resources available on the PC.

SUMMARY

A media experience policy engine includes three components: an information manager, a policy evaluator, and an enforcement module. The information manager collects information regarding the current state of a media delivery system, such as usage of a CPU, memory, hard disk, (I/O) interface, and a network. This collected data is then verified by the policy evaluator to see if resource contention is, or is close to, occurring. If so, existing or potential conflicts are dealt with by the enforcement module, which applies corrections, such as, for example, limiting the access of later chronologic users, or degrading the user experience of all users, in accordance with a desired policy in order to vitiate the resource contention and maintain a user experience consistent with the desired policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Home Environment

Figure 1:
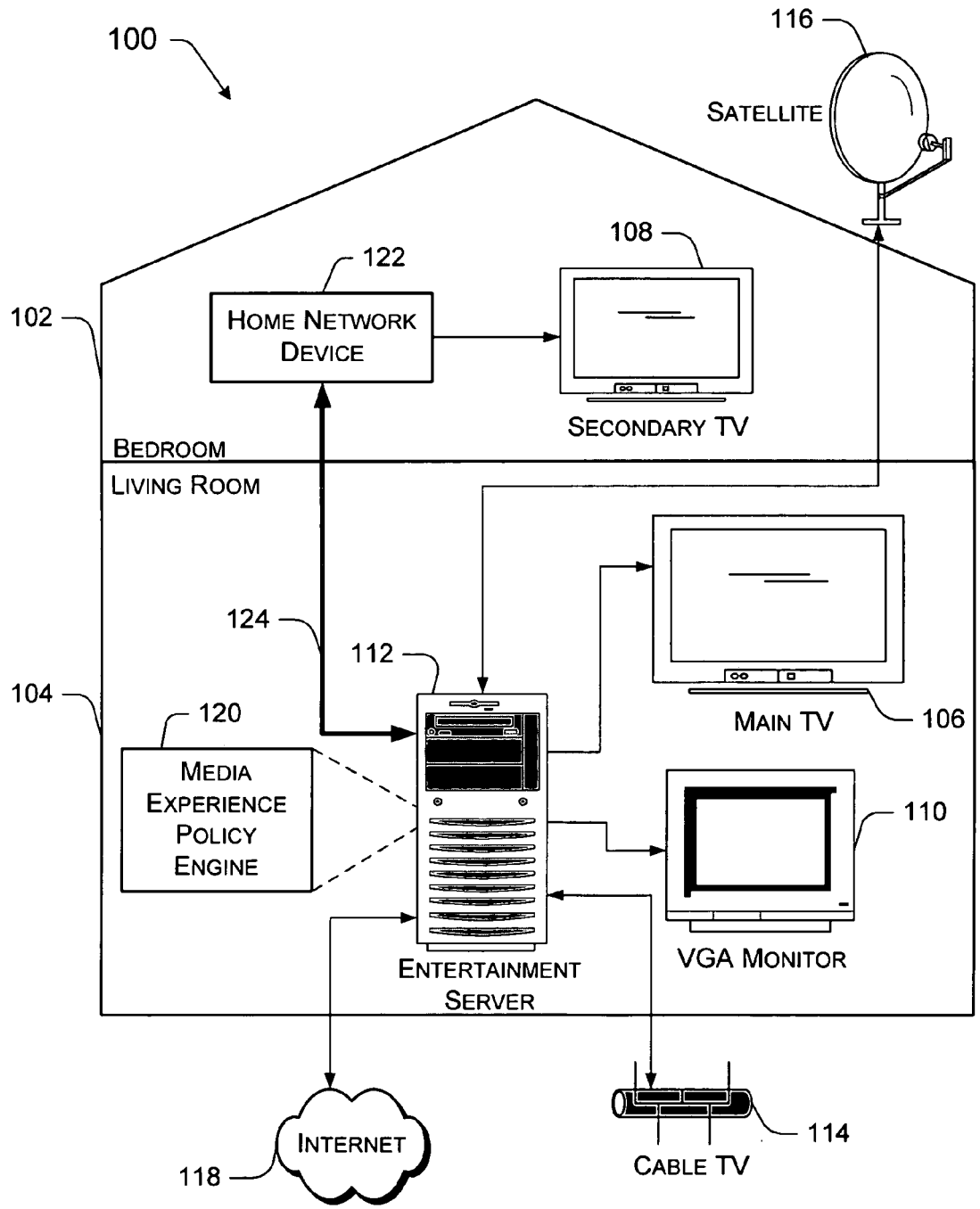
FIG. 1 illustrates an exemplary home environment including an entertainment server, a home network device, and a home television.

FIG. 1 shows an exemplary home environment 100 including a bedroom 102 and a living room 104. Situated throughout the home environment 100 are a plurality of monitors, such as a main TV 106, a secondary TV 108, and a VGA monitor 110. Content may be supplied to each of the monitors 106, 108, 110 over a home network from an entertainment server 112 situated in the living room 104. In one implementation, the entertainment server 112 is a conventional personal computer (PC) configured to run a multimedia software package like the Windows® XP Media Center™ edition operating system marketed by the Microsoft Corporation. In such a configuration, the entertainment server 112 is able to integrate full computing functionality with a complete home entertainment system into a single PC. For instance, a user can watch TV in one graphical window of one of the monitors 106, 108, 110 while sending email or working on a spreadsheet in another graphical window on the same monitor. In addition, the entertainment system may also include other features, such as:

- A Personal Video Recorder (PVR) to capture live TV shows for future viewing or to record the future broadcast of a single program or series.
- DVD playback.
- An integrated view of the user's recorded content, such as TV shows, songs, pictures, and home videos.
- A 14-day EPG (Electronic Program Guide).

In addition to being a conventional PC, the entertainment server 112 could also comprise a variety of other devices capable of rendering a media component including, for example, a notebook or portable computer, a tablet PC, a workstation, a mainframe computer, a server, an Internet appliance, combinations thereof, and so on. It will also be understood, that the entertainment server 112 could be an entertainment device, such as a set-top box, capable of delivering media content to a computer where it may be streamed, or the entertainment device itself could stream the media content.

With the entertainment server 112, a user can watch and control a live stream of television or audio content received, for example, via cable 114, satellite 116, an antenna (not shown for the sake of graphic clarity), and/or a network such as the Internet 118. This capability is enabled by one or more tuners residing in the entertainment server 112. It will also be understood, however, that the one or more tuners may be located remote from the entertainment server 112 as well. In both cases, the user may choose a tuner to fit any particular preferences. For example, a user wishing to receive both standard definition (SD) and high definition (HD) content should employ a tuner configured for both types of contents. Alternately, the user could employ an SD tuner for SD content, and an HD tuner for HD content.

The entertainment server 112 may also enable multi-channel output for speakers (not shown for the sake of graphic clarity). This may be accomplished through the use of digital interconnect outputs, such as Sony-Philips Digital Interface Format (SPDIF) or Toslink enabling the delivery of Dolby Digital, Digital theater Sound (DTS), or Pulse Code Modulation (PCM) surround decoding.

Additionally, the entertainment server 112 may include a media experience policy engine 120 configured to allow a user to control the behavior of the entertainment server 112 under various load conditions. The media experience policy engine 120 is configured to enable a user to monitor actual resource utilization of the entertainment server 112 and respond appropriately in high load situations where resource contention is occurring or is about to occur. In this way the media experience policy engine 120 can be used to customize resource management performed by the entertainment server 112 and avoid deleterious resource contention which might otherwise degrade a user experience to an unpredictable, and unacceptable quality level. The media experience policy engine 120, and methods involving its use, will be described in more detail below in conjunction with FIGS. 2-6.

Since the entertainment server 112 may be a full function computer running an operating system, the user may also have the option of running standard computer programs (word processing, spreadsheets, etc.), sending and receiving emails, browsing the Internet, or performing other common functions.

The home environment 100 also may include a home network device 122 placed in communication with the entertainment server 112 through a network 124. Home network devices 122 may include Media Center Extender devices marketed by the Microsoft Corporation, Windows® Media Connect devices, game consoles, such as the Xbox game console marketed by the Microsoft Corporation, and devices which enable the entertainment server 112 to stream audio and/or video content to a monitor 106, 108, 110 or audio system. The home network device 122 may also be implemented as any of a variety of conventional computing devices, including, for example, a desktop PC, a notebook or portable computer, a workstation, a mainframe computer, an Internet appliance, a gaming console, a handheld PC, a cellular telephone or other wireless communications device, a personal digital assistant (PDA), a set-top box, a television, an audio tuner, combinations thereof, and so on.

The network 124 may comprise a wired, and/or wireless network, or any other electronic coupling means, including the Internet. It will be understood that the network 124 may enable communication between the home network device 122 and the entertainment server 112 through packet-based communication protocols, such as transmission control protocol (TCP), Internet protocol (IP), real time transport protocol (RTP), and real time transport control protocol (RTCP). The home network device 122 may also be coupled to the secondary TV 108 through wireless means or conventional cables.

The home network device 122 may be configured to receive a user experience stream (i.e. the system/application user interface, which may include graphics, buttons, controls and text) as well as a compressed, digital audio/video stream from the entertainment server 112. The user experience stream may be delivered in a variety of ways, including, for example, standard remote desktop protocol (RDP), graphics device interface (GDI), or hyper text markup language (HTML). The digital audio/video stream may comprise video IP, SD, and HD content, including video, audio and image files, decoded on the home network device 122 and then "mixed" with the user experience stream for output on the secondary TV 108. In one exemplary implementation, media content is delivered to the home network device 122 in the MPEG 2 format.

In FIG. 1, only a single home network device 122 is shown. It will be understood, however, that a plurality of home network devices 122 and corresponding displays may be dispersed throughout the home environment 100, communicatively coupled to the entertainment server 112. It will also be understood that in addition to the home network device 122 and the monitors 106, 108, 110, the entertainment server 112 may be communicatively coupled to other output peripheral devices, including components such as speakers and a printer (not shown for the sake of graphic clarity).

System with a Media Experience Policy Engine

Figure 2:
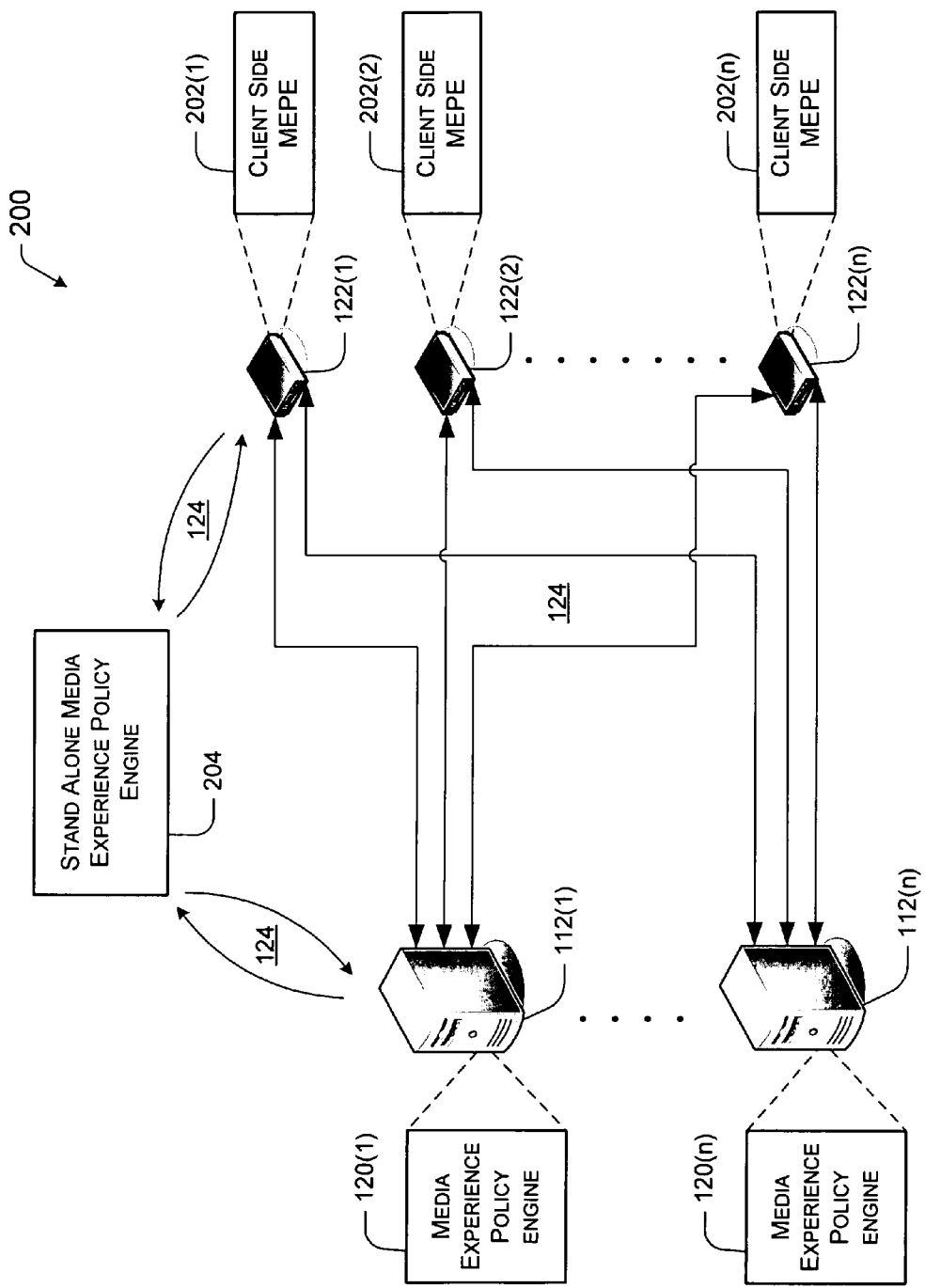
FIG. 2 illustrates a system of multiple entertainment servers in communication with multiple home network devices using a media experience policy engine.

FIG. 2 shows an exemplary architecture 200 suitable for delivering media content to a plurality of home network devices 122 from a plurality of entertainment servers 112 over network 124. As shown in FIG. 2, the media experience policy engine 120 may reside on one, several, or all of the plurality of entertainment servers 112. Moreover, a client side media experience policy engine (MEPE) 202 may reside on one, several, or all of the plurality of home network devices 122. In addition, a stand alone media experience policy engine 204 may also reside on another device, for example, a special purpose device or a server in communication with the network 124.

In perhaps its simplest implementation, the media experience policy engine 120 may be run on a single entertainment server 112 serving two or more users. Typically, this might involve one user at the entertainment server 112 itself and one or more users operating home network devices 122. Other user configurations are possible, however, including multiple users working on the same entertainment server 112 through the use of software that enables two or more keyboards, mice, monitors, etc., to be plugged into the entertainment server 112. In scenarios such as this, where a single entertainment server 112 is being utilized, it is also possible to use a client side MEPE 202 along with, or to the exclusion of, the media experience policy engine 120 on the single entertainment server 112.

In more complex multi-user implementations, one or more of the entertainment servers 112 or home network devices 122 may share one or more instances of the media experience policy engine 120, 202 residing on one of the entertainment servers 112 or home network devices 122. Alternately, the one or more entertainment servers 112 or home network devices 122 may share the stand alone media experience policy engine 204 in addition to the media experience policy engines 120, 202 residing on one of the entertainment servers 112 or home network devices 122.

In addition, the one or more entertainment servers 112 and home network devices 122 may also use a discrete instance of the media experience policy engine (including a media experience policy engine 120, the stand alone media experience policy engine 204, and a client side MEPE 202), which then may coordinate with the media experience policy engines 120, 202, 204 residing on one or more of the other devices 112, 122.

In yet another implementation, a single media experience policy engine 120, 202, 204 may be used to service all of the devices coupled to network 124.

It will be understood that the client side MEPE 202, if present, may be used to gather statistical and other information regarding the resources of the network 124 and of home network device 122 on which the client side MEPE 202 resides. Alternately, this information could be collected by another application on the home network device 122 or on one of the other home network devices 122, or entertainment servers 112.

Throughout this document, when reference is made to the media experience policy engine 120, it will be understood that this reference may also include the client side MEPE 202 and the stand alone media experience policy engine 204.

Figure 3:
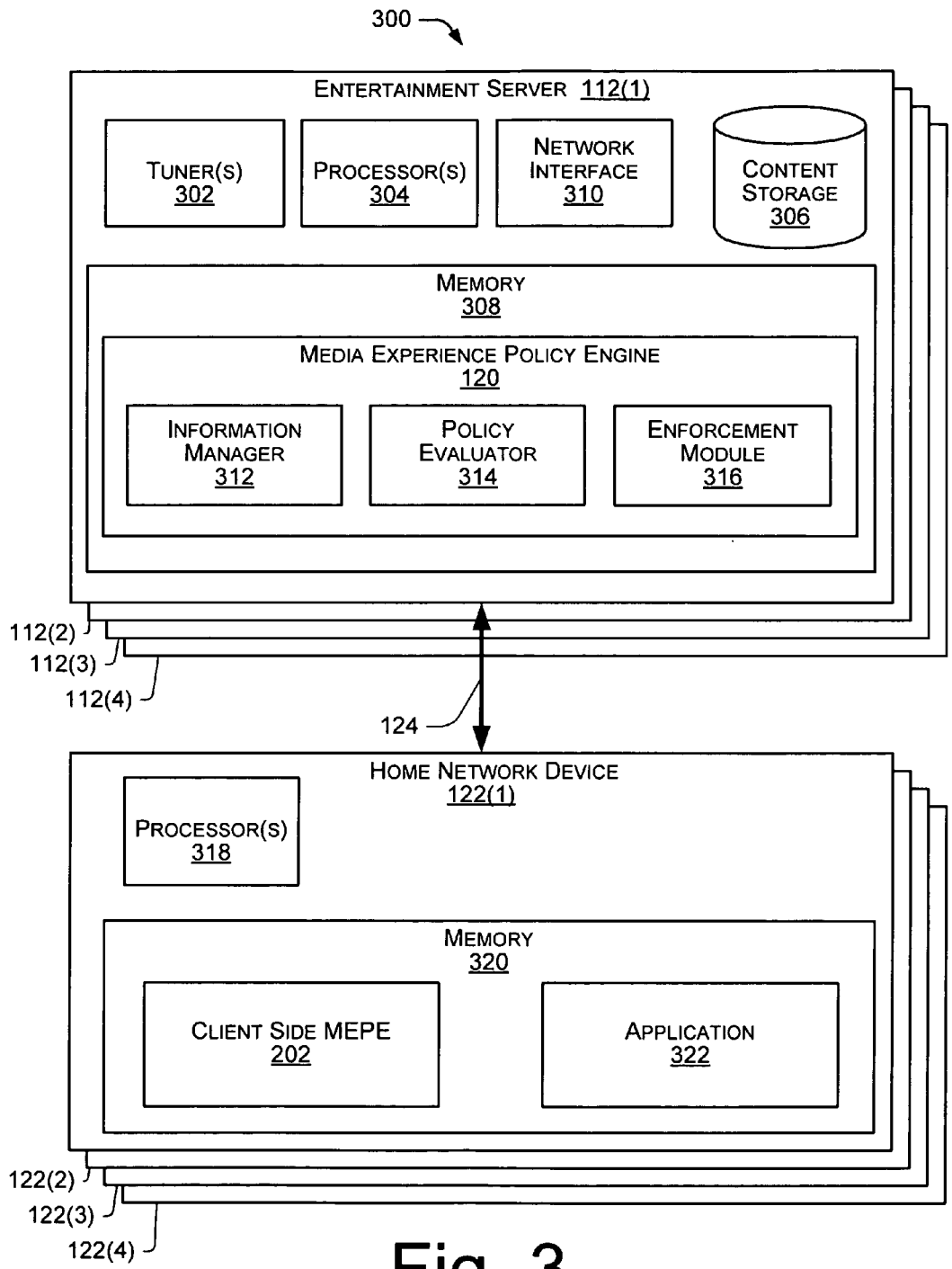
FIG. 3 illustrates a block diagram of a media experience policy engine being used in conjunction with a plurality of entertainment servers communicatively coupled to a plurality of home network devices.

Entertainment Server and Home Network Device with a Media Experience Policy Engine FIG. 3 shows an exemplary architecture 300 suitable for delivering media content to one or more home network devices 122 from one or more entertainment servers 112. In FIG. 3, the media experience policy engine 120 is illustrated as residing on the entertainment server(s) 112. As noted above, however, it will be understood that the media experience policy engine 120 need not be hosted on the entertainment server(s) 112. For example, the media experience policy engine 120 could also be hosted on a set top box, or any other electronic device or storage medium communicatively coupled to a path along which media content is conveyed on its way from a source (i.e. Internet 118, cable 114, satellite 116, antennae, etc.) to the home network device(s) 122. Moreover, it will also be understood that the media experience policy engine 120 may deliver functional program code to devices, such as the home network devices 122, with which it is coupled over the network 124. This program code can be configured to assist the media experience policy engine 120 to carry out its functionality.

As discussed above, the entertainment server(s) 112 may be implemented as any of a variety of conventional computing devices, including, for example, a server, a desktop PC, a notebook or portable computer, a workstation, a mainframe computer, an Internet appliance, a set top box, combinations thereof, and so on, that are configurable to deliver stored and/or live media content to a client device such as the home network device(s) 122.

The entertainment server(s) 112 may include one or more tuners 302, one or more processors 304, a content storage 306, memory 308, and one or more network interfaces 310. The tuner(s) 302 may be configured to receive media content via sources such as cable 114, satellite 116, an antenna, or the Internet 118. The media content may be received in digital form, or it may be received in analog form and converted to digital form at any of the one or more tuners 302 or by the one or more microprocessors 304 residing on the entertainment server(s) 112. Media content either processed and/or received (from another source) may be stored in the content storage 306. FIG. 3 shows the content storage 306 as being separate from memory 308. It will be understood, however, that content storage 306 may also be part of memory 308.

The network interface(s) 310 may enable the entertainment server(s) 112 to send and receive commands and media content among a multitude of devices communicatively coupled to the network 124. For example, in the event both the entertainment server(s) 112 and the home network device(s) 122 are connected to the network 124, the network interface 310 may be used to deliver content such as live HD television content from the entertainment server(s) 112 over the network 124 to the home network device(s) 122 in real-time with media transport functionality (i.e. the home network device(s) 122 may render the media content and the user may be afforded functions such as pause, play, etc). In addition, the entertainment server(s) 112 may deliver media content to each other over the network 124.

Requests from the home network device(s) 122 and/or other entertainment server(s) 112 for media content available on, or through, one of the entertainment servers 112 may also be routed from the home network device(s) 122 and/or other entertainment server(s) 112 to the entertainment server 112 via network 124. In general, it will be understood that the network 124 is intended to represent any of a variety of conventional network topologies and types (including optical, wired and/or wireless networks), employing any of a variety of conventional network protocols (including public and/or proprietary protocols). As discussed above, network 124 may include, for example, a home network, a corporate network, the Internet, or IEEE 1394, as well as possibly at least portions of one or more local area networks (LANs) and/or wide area networks (WANs).

The entertainment server(s) 112 can make any of a variety of data or content available for delivery to the home network device(s) 122 and/or other entertainment server(s) 112, including content such as audio, video, text, images, animation, and the like. In one implementation, this content may be streamed from the entertainment server(s) 112 to the home network device(s) 122 and/or other entertainment server(s) 112. The terms "streamed" or "streaming" are used to indicate that the data is provided over the network 124 to the home network device(s) 122 and or other entertainment server(s) 112 and that playback of the content can begin prior to the content being delivered in its entirety. The content may be publicly available or alternatively restricted (e.g., restricted to only certain users, available only if an appropriate fee is paid, restricted to users having access to a particular network, etc.). Additionally, the content may be "on-demand" (e.g., pre-recorded, stored content of a known size) or alternatively it may include a live "broadcast" (e.g., having no known size, such as a digital representation of a concert being captured as the concert is performed and made available for streaming shortly after capture).

Memory 308 stores programs executed on the processor(s) 304 and data generated during their execution. Memory 308 may include volatile media, non-volatile media, removable media, and non-removable media. It will be understood that volatile memory may include computer-readable media such as random access memory (RAM), and non volatile memory may include read only memory (ROM). A basic input/output system (BIOS), containing the basic routines that help to transfer information between elements within the entertainment server(s) 112, such as during start-up, may also be stored in ROM. RAM typically contains data and/or program modules that are immediately accessible to and/or presently operated on by the one or more processors 304.

The entertainment server(s) 112 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. The hard disk drive, magnetic disk drive, and optical disk drive may be each connected to a system bus (discussed more fully below) by one or more data media interfaces. Alternatively, the hard disk drive, magnetic disk drive, and optical disk drive may be connected to the system bus by one or more interfaces.

The disk drives and their associated computer-readable media provide non-volatile storage of computer readable instructions, data structures, program modules, and other data for the entertainment server(s) 112. In addition to including a hard disk, a removable magnetic disk, and a removable optical disk, as discussed above, the memory 308 may also include other types of computer-readable media, which may store data that is accessible by a computer, like magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the memory 308 including, by way of example, an operating system, one or more application programs, other program modules, and program data. One such application could be the media experience policy engine 120, which includes an information manager 312, a policy evaluator 314, and an enforcement module 316. The media experience policy engine 120 may be executed on processor(s) 304, and can enable a user to monitor actual resource utilization of the entertainment server(s) 112 and the network 124 and respond appropriately in high load situations where deleterious resource contention is occurring or is about to occur. In addition to being implemented, for example, as a software module stored in memory 308, the media experience policy engine 120 may also reside, for example, in firmware. Moreover, even though the information manager 312, policy evaluator 314, and enforcement module 316 are shown in FIG. 3 as residing inside the media experience policy engine 120, any or all of these elements may exist separate and as stand alone applications. More discussion of the nature and function of the media experience policy engine 120 will be given below.

The entertainment server(s) 112 may also include a system bus (not shown for the sake of graphic clarity) to communicatively couple the one or more tuners 302, the one or more processors 304, the network interface 310, and the memory 308 to one another. The system bus may include one or more of any of several types of bus structures, including a memory bus or memory controller, a peripheral bus, an accelerated graphics port, and a processor or local bus using any of a variety of bus architectures.

A user may enter commands and information into the entertainment server(s) 112 via input devices such as a keyboard, pointing device (e.g., a "mouse"), microphone, joystick, game pad, satellite dish, serial port, scanner, and/or the like. These and other input devices may be connected to the one or more processors 304 via input/output (I/O) interfaces that are coupled to the system bus. Additionally, input devices may also be connected by other interface and bus structures, such as a parallel port, game port, universal serial bus (USB) or any other connection included in the network interface 310.

In a networked environment, program modules depicted and discussed above in conjunction with the entertainment server(s) 112 or portions thereof, may be stored in a remote memory storage device. By way of example, remote application programs may reside on a memory device of a remote computer communicatively coupled to network 124. For purposes of illustration, application programs and other executable program components, such as the operating system and the media experience policy engine 120, may reside at various times in different storage components of the entertainment server(s) 112, or of a remote computer, and may be executed by one of the at least one processors 304 of the entertainment server(s) 112 or of the remote computer.

The exemplary home network device(s) 122 may include one or more processors 318, and a memory 320. Memory 320 may include one or more applications 322 that consume or use media content received from sources such as the entertainment server 112. Memory 320 may also contain a client side MEPE 202 which may be used in conjunction with, or to the exclusion of, the media experience policy engine 120 in the entertainment server(s) 112. Similar to the experience policy engine 120 in the entertainment server(s) 112, the client side MEPE may also include an information manager, policy evaluator and enforcement module (not shown for the sake of graphic clarity). In addition to being implemented as a software module stored in memory 308, the client side MEPE 202 may also reside, for example, in firmware.

Media Experience Policy Engine Functionality

In operation, users may request media content from one or more entertainment servers 112 using home networking device(s) 122 or other entertainment server(s) 112 or devices coupled to the host entertainment server(s) 112 over network 124. In addition, as noted above, multiple users may work simultaneously on the same entertainment server 112 through the use of software that enables multiple keyboards, mice, monitors, etc. to be plugged into the entertainment server 112.

The requests for media content may take many forms, including requests to view streamed HD or SD content from a live source (such as Internet 118, cable 114, antennae, or satellite 116), receive audio content saved in content storage 306, or access and work in an application saved in memory 308. As more users make requests for media content from the one or more entertainment servers 112, or as the existing users' requests become greater and require more processing power and network capacity, a danger exists that the requests may outstrip the available resources of the one or more entertainment servers 112 and the network 124. For example, if the network 124 only has enough capacity to stream one channel of HD content to a home network device 122, then if two channels are requested, the network 124 will be overloaded. When this occurs, unexpected and undesireable behavior can result in disruptions encountered at the entertainment server(s) 112, network 124, and home network device(s) including arbitrary degradation of user experience, or arbitrary exclusion of one or more users from receiving content from the entertainment server(s) 112.

The media experience policy engine 120, client side MEPE 202, and stand alone media experience policy engine 204 exist to avert such unexpected and undesirable behavior which may result in disruption of a user experience by adaptively managing the resources of the one or more servers 112 and the network 124 according to a desired policy in order to avoid deleterious resource contention. As will be discussed in more detail below, desired policies direct how certain user experiences should be maintained in the face of resource contention.

Information Manager

While the one or more of the entertainment servers 112 are delivering media content to users, the information manager 312 in the media experience policy engine 120 actively monitors actual resource utilization in the exemplary architecture 300. The resources monitored by the information manager 312 may include, for example, CPU usage, memory usage, (I/O) interface usage and hard disk usage, for the one or more entertainment servers 112 as well as the network devices 122 from which users are making requests for media content. In addition, the usage of the network 124 may also be monitored by the information manager 312.

The usage data collected by the information manager 312 may be in total terms, or it may include data for specific devices or users. In one implementation, the information manager 312 may view the total usage of network 124 as well as the total usage of network 124 caused by the requests of a particular user or device. In a similar fashion, data representing total usage, and/or usage caused by particular users or devices, may be collected for CPU usage, memory usage, (I/O) interfaces usage, and hard disk usage on the entertainment servers 112, and the home network devices 122.

Policy Evaluator

Usage information collected by the information manager 312 may then be examined for resource contention issues. This may be done by the policy evaluator 314, which may take the usage data collected by the information manager 312 and compare it to total available resources. Individual policies may spell out how individual user experiences for different users on the network 124 will be affected when resources of the network reach contention. For example, the data collected by the information manager 312 concerning the total usage of the network 124 may be viewed against the total available capacity of the network 124 to see if the network 124 is close to saturation. In a similar fashion, the CPU(s), memories, (I/O) interfaces, and hard disks, for entertainment server(s) 112—as well as for network devices 122—may be analyzed by the policy evaluator 314 for resource contention in order to determine if the CPU(s), memories, (I/O) interfaces, and hard disks are in danger of becoming oversaturated.

If no conflicts exist, and there is no danger of oversaturation of any of the resources of architecture 300, then no intervention is necessary. However, if any of the resources are found to be close to saturation, the policy evaluator 314 may check the current state of the architecture 300 against a desired policy in order to determine whether the current state of the architecture 300 matches that mandated by the desired policy.

The saturation limits used by the policy evaluator 314 may themselves be set, or reset, by a user. For example, saturation may be defined as 80% of the total capacity of the CPU of the entertainment server 112. Thus, when 80% of the capacity of the CPU on the entertainment server 112 is being used, the policy evaluator 314 will recognize the CPU as being saturated. Setting saturation limits like this below 100% may avoid reaching a situation where an entertainment server 112 or home network device 122 is over subscribed.

In addition, the desired policies themselves may be predetermined or pre-entered by users, or set and reset during operation of the architecture 300. In one exemplary implementation, a variety of possible predetermined desired policies may be loaded onto an entertainment server 112 or home network device 122 by a manufacturer or other entity in the distribution chain from the manufacturer to the user. The user may then choose from a list of the possible preset options to activate a predetermined desired policy most suitable given the user's own unique needs and priorities. Preset options, and predetermined desired policies, available to a user may be presented in easy to follow 'plain English' (i.e. language understandable by non technical users).

As mentioned above, policies direct how certain user experiences should be maintained in the face of resource contention. For example, a desired policy might mandate a flawless or high quality experience for the first (chronological) user of the architecture 300 while degrading the experience for subsequent users. Potentially, such a desired policy might include refusing service to a last user whose use might lead to resource contention.

Alternately, another desired policy might mandate a flawless or high quality experience for a high priority user (such as a parent or an owner of an entertainment server 112) and degrade the experience for lower priority users (e.g. children and non owners of an entertainment server 112). Such a policy could potentially include refusing service to a lowest priority user whose use might lead to resource contention.

In another example, a desired policy might mandate a flawless or high quality user experience for the highest quality display (e.g. a HDTV monitor) and degrade the experience for lower quality displays (e.g. the SDTV monitors). Alternately, the desired policy could mandate delivering HD content only to HD displays, and SD content to all other displays.

Moreover, a desired policy might mandate the degradation of all user experiences equally, such that all users share the resources of architecture 300, as well as the degradation of the resources of architecture 300, fairly. In addition, the desired policy might also allow one or more priority users to decide the fates of lower priority users. In such a case, prompts could be issued to the one or more priority users listing the lower priority users and the possible actions that could be taken in order to rectify any resource contention issues. The one or more high priority users could then respond in a manner of their choosing. For example, consider a scenario in which a high priority user goes to watch a media stream on the main TV 106 in the living room 104 and forgets to discontinue receiving a media content stream on the secondary TV 108 in the bedroom 102. Later, if resource contention develops, the high priority user could be issued a prompt on the main TV 106 giving him the option of discontinuing the streaming to the secondary TV 108.

In addition, all of the desired policies mentioned above might also contain provisions to punish or contain high volume users. For example, the policy evaluator 314 could examine the usage data for evidence of any users or devices consuming a disproportionate percentage of the resources of the architecture 300. If found, these users or devices could be subjected to special treatment, including degradation of user experience, or preclusion from further use of the resources of architecture 300.

Enforcement Module

Once the information collected by the information manager 312 has been examined for resource contention, and the current state of the architecture 300 has been reviewed against the desired policy by the policy evaluator 314, the enforcement module 316 takes control and ensures that the desired policy is implemented across all users and devices.

The enforcement module 316 may follow two broad categories of enforcement—interactive and non-interactive. What form of enforcement the enforcement module 316 follows may be mandated by the desired policy, a pre-entered computer setting, or an answer received from a user prompt.

In the event that interactive enforcement is mandated, the enforcement module 316 may notify one or more users that resource contention exists and then present them with options for remedying the situation. Both the notifications and options may be presented to users in easy to follow 'plain English' (i.e. language understandable by non technical users). For example, in the event that usage of the network 124 is too high, the enforcement module 316 might present the one or more users with one or more options. In one implementation the enforcement module 316 might present the one or more users with the option of listening to music instead of watching TV since delivery of audio content consumes less bandwidth than the delivery of audio and video content. Additionally, the enforcement module 316 could direct the one or more users to switch from an HD feed to an SD feed (for example, from an HDTV channel to a SDTV channel) in order to decrease the network usage and thus ameliorate the related network resource contention issue.

In another possible implementation, the enforcement module 316 could prompt the one or more users to join a media experience shared with other users (multicast vs. unicast). Additionally, the enforcement module 316 could prompt the one or more users to switch to a delayed playback mode. Such an election would allow the one or more entertainment servers 112 to download and cache the media in non-real-time before playing it for the one or more users. Also, the enforcement module 316 could give the one or more users the choice to allow a reduction in bit-rate of media content being delivered to them through use of a transrater/transcoder.

Moreover, the enforcement module 316 could offer the one or more users the choice of reducing the media encoder bit-rate (if the source is being encoded in real-time). Additionally, the enforcement module 316 could offer the one or more users the choice to switch to a different bit-rate and/or format in a multi-bit-rate/multi-format media file.

In yet another example, the enforcement module 316 could allow the one or more users to choose to enable network prioritization (e.g. WiFi Multimedia) to ensure that the most important streams are not degraded (which in turn means that streams of lesser importance might be degraded).

Similarly, in the event that usage of the memory 308, 320 in the one or more entertainment servers 112 or home network devices 122 is too high, the enforcement module 316 might present the one or more users with one or more options designed to decrease memory usage. In one exemplary implementation, the enforcement module 316 might present the one or more users with the option of switching to viewing non-digital rights management (DRM) protected media content, such as switching television channels from a pay site such as a Home Box Office® TV channel, to a publicly available channel such as an American Broadcasting Company (ABC) TV channel. This action may decrease memory requirements by vitiating the need to load encryption/decryption or policy manager components on the memory 308, 320 of the one or more entertainment servers 112 and home network devices 122.

The enforcement module 316 could also prompt one or more users to allow for the unloading of components not in use. In one instance this could include moving at least one of the one or more users to another entertainment server 112, such that the entertainment server 112 from which the at least one user was moved could be made devoid of users, and therefore could be shut down.

In another example, the enforcement module 316 could prompt the one or more users to allow for the switching of experiences of the one or more users. For example, the enforcement module 316 could reduce the fidelity of the UI experience (if it is driven from the one or more entertainment servers 112 or the home network devices 122) from a rich experience to a flat experience.

In the event that the enforcement module 316 determines that CPU usage on the one or more entertainment servers 112 or home network devices 122 is too high, the enforcement module 316 may prompt the one or more users to take appropriate actions to decrease CPU usage. For example, the enforcement module 316 may prompt the one or more users to switch to viewing non-DRM protected media content in order to eliminate the encryption/decryption and policy manager overhead associated with DRM content. Similarly, the enforcement module 316 may prompt the one or more users to switch from an HD feed to an SD feed (for example, from an HDTV channel to an SDTV channel).

In the event that the enforcement module 316 determines that hard disk usage on the one or more entertainment servers 112 or home network devices 122 is too high, the enforcement module 316 may prompt the one or more users to take appropriate actions to decrease hard disk usage. For example, the enforcement module 316 may prompt the one or more users to switch to a lower bandwidth stream (e.g. music instead of television, SDTV instead of HDTV).

In the event that a bottleneck in encountered at, for example, an (I/O) interface, another option that can be employed is the use of load-balancing between multiple entertainment servers 112 or home network devices 122. In such case, the enforcement module 316 may offer one or more users the option to allow the stand alone media experience policy engine 204 and/or the media experience policy engines 120, 202 from entertainment servers 112 and home network devices 122 to collaborate in order to dynamically shift load from one of the entertainment servers 112 or network devices 122 to another. Alternately, one "primary" policy engine 120, 202 on one of the entertainment servers 112 or home network devices 122—or the stand alone media experience policy engine 204—could collect feedback from all PCs/devices and act on it to decrease and ultimately ameliorate the bottleneck.

In one implementation, only user(s) whose user experience will be affected by mandates from the desired policy will be presented with enforcement options. In another implementation, users whose experience will not be affected may also be issued information relating to the possible resource contention issues and the possible actions which may be taken.

In the case of non-interactive enforcement, the policy enforcement module 316 may implement changes to the environment 300 without prompting any users or giving any warning of impending changes that will be implemented. Alternately, the policy enforcement module 316 may display an explanation or description of ensuing changes to affected users, nonaffected users, or any subsets thereof. In such a scenario, explanations may be presented to users in easy to follow 'plain English' (i.e. language understandable by non technical users).

It will be understood that the actions that can be taken by policy enforcement module 316 to institute the enforcement measures using noninteractive enforcement may include all of those measures discussed above in conjunction with interactive enforcement.

It will also be understood that other techniques can be used in addition to those mentioned above. Moreover, the techniques above may be mixed and matched, such that the enforcement module 316 may use multiple approaches together, including combinations of both interactive and non-interactive enforcement techniques.

In addition, it will also be understood that many changes mentioned above necessarily incur expenses. For example, when a high bit-rate stream is dynamically transrated/transcoded, quality of a user experience is reduced and increased CPU usage on an entertainment server 112 or home network device 122 results. Accordingly, the policy engine 120 may evaluate options using a multi-variable evaluation. For example the policy engine 120 may identify all options that would resolve the highest priority bottleneck and rate the options in order to find the best fit (i.e. the one that does not spawn an even higher priority bottleneck). Once a best fit is identified in which no resources are overtaxed, the policy engine 120 may implement the option.

Media Experience Policy Adherence Method

Figure 4:
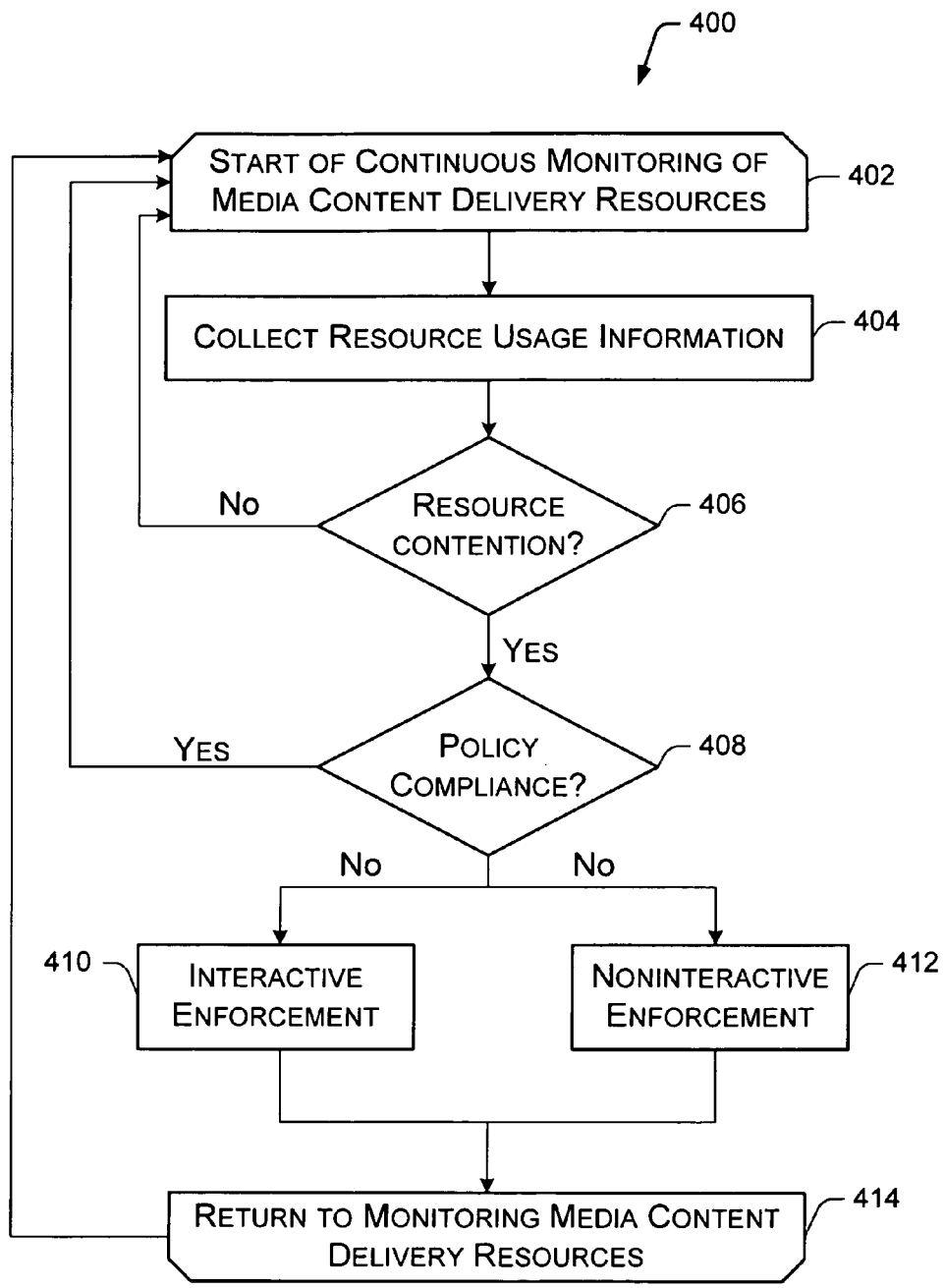
FIG. 4 is a flow diagram illustrating a method for continuously monitoring network resources and dynamically resolving resource contention issues.

Another aspect of dealing with dynamic load balancing of entertainment servers 112 and home network devices 122 is shown in FIG. 4 which illustrates an exemplary method 400 performed by the media experience policy engine 120. For ease of understanding, the method 400 is delineated as separate steps represented as independent blocks in FIG. 4; however, these separately delineated steps should not be construed as necessarily order dependent in their performance. Additionally, for discussion purposes, the method 400 is described with reference to elements in FIGS. 1-3.

The method 400 continuously monitors the status of media content delivery resources at a block 402. This may be accomplished by continuously monitoring resource usage, including, for example, CPU usage, memory usage, (I/O) interface usage and hard disk usage, for the one or more entertainment servers 112 as well as the network devices 122 from which users are making requests for media content (block 404). In addition, the usage of the network 124 may also be monitored. In one exemplary implementation, the monitoring of resources may be performed by the information manager 312. The collected usage data may be in total terms, or it may include data for specific devices 122 or users. In one implementation, the method 400 may view the total usage of network 124 as well as the total usage of network 124 caused by the requests of a particular user, home network device 122 or entertainment server 112. In a similar fashion, data representing total usage, and/or usage caused by particular users or devices, may be collected for CPU usage, memory usage, (I/O) interfaces usage, and hard disk usage on the entertainment servers 112, and the home network devices 122.

The collected usage information may be examined by the method 400 for resource contention issues (block 406). In one exemplary implementation, this may be done by the policy evaluator 314. The collected usage data may be compared against total available resource data. For example, the collected data concerning the total usage of the network 124 may be viewed against the total available capacity of the network 124 to see if the network 124 is close to saturation. In a similar fashion, the CPU(s), memories, (I/O) interfaces, and hard disks, for entertainment server(s) 112—as well as the network devices 122—may be analyzed for resource contention in order to determine if the CPU(s), memories, (I/O) interfaces, and hard disks are in danger of becoming oversaturated.

If no conflicts exist, and there is no danger of over saturation of any of the resources of architecture 300, then no intervention is necessary, and the method 400 returns to block 402 (i.e. the "no" branch from block 406).

Alternately, however, if any of the resources are found to be close to saturation (i.e. the "yes" branch from block 406), the method 400 will compare the current state of the architecture 300 against a desired policy in order to determine whether the current state of the architecture 300 matches that which is mandated under the desired policy (block 408). Desired policies may, for example, be pre-entered by users, preset by manufacturers or resellers, or set and reset during operation of the architecture 300. In one implementation, a desired policy might mandate a flawless or high quality experience for the first (chronological) user of the architecture 300 while degrading the experience for subsequent users. Potentially, such a desired policy might include refusing service to a last user whose use might lead to resource contention.

In another possible implementation, a desired policy might mandate a flawless or high quality experience for a user of primary user (such as a parent or an owner of an entertainment server 112) and degrade the experience for lower priority users (e.g. children and non owners of an entertainment server 112). Such a policy could potentially include refusing service to a lowest priority user whose use might lead to resource contention.

In yet another possible implementation, a desired policy might mandate a flawless or high quality user experience for the highest quality display (e.g. a HDTV monitor) and degrade the experience for lower quality displays (e.g. the SDTV monitors). Alternately the policy could mandate delivering HD content only to HD displays, and SD content to all other displays.

In still another possible implementation, a desired policy might mandate the degradation of all users experiences equally, such that all users fairly share the resources of architecture 300, as well as the degradation of the resources of architecture 300.

In all of the implementations above, desired policies might also contain provisions to punish or contain high volume users. For example, the usage data could be examined for evidence of any users or devices consuming a disproportionate percentage of the resources of the architecture 300. If found, these users or devices could be subjected to special treatment, including degradation of user experience, or preclusion from further use of the resources of architecture 300.

If the current state of the architecture 300 is found at block 408 to be in compliance with the desired policy then no intervention is necessary, and the method 400 returns to block 402 (i.e. the "yes" branch from block 408). If, however, the current state of the architecture 300 is found at block 408 to not be in compliance with the desired policy (i.e. the "no" branch from block 406), policy enforcement may be pursued.

The method 400 may impose interactive enforcement (block 410) or noninteractive enforcement (block 412) depending on what form of enforcement is mandated by the desired policy, a pre-entered computer setting, or an answer received from a user prompt.

Under interactive enforcement, the method 400 may notify one or more users that resource contention exists and then present them with options for remedying the situation. The users notified may include those whose user experience may be affected by changes to be brought on by enforcement of the desired policy, or alternately, all users or a subset thereof may receive notification.

In one exemplary implementation, in the event that usage of the network 124 is too high, the method 400 might present one or more users with one or more of several options including the option of listening to music instead of watching TV, or switching from an HDTV channel to a SDTV channel in order to decrease the network usage. Similar prompts may be presented in order to ameliorate resource contention issues arising from CPU, memory, and hard disk usage, as well as I/O interface bottlenecks.

In the event that non-interactive enforcement (block 412) is pursued by the method 400, changes may be made to the environment 300 without prompting any users or giving any warning of impending changes. Alternately, an explanation or description of ensuing changes may be displayed to affected users, nonaffected users, or to any subsets thereof.

For example, if network usage is determined to be too high, under one exemplary implementation of noninteractive enforcement, the media bit-rate of media content being streamed to one or more users may be reduced through use of a transater/transcoder. Similar actions may be taken in order to ameliorate resource contention issues arising from CPU, memory, and hard disk usage, as well as I/O interface bottlenecks.

It will also be understood that other techniques can be used in addition to those examples mentioned above, including offering prompts to one or more high priority users, enabling them to decide the fates of lower priority users. Moreover, the techniques above may be mixed and matched, such that multiple approaches may be used together, including combinations of both interactive and non-interactive enforcement techniques.

In one exemplary implementation, the enforcement module 316 may be used to affect both the interactive and the noninteractive enforcement techniques.

It will also be understood that most changes mentioned above necessarily incur expenses. For example, when a high bit-rate stream is dynamically transrated/transcoded, quality or a user experience is reduced and increased CPU usage or an entertainment server or home network device 122 is increased. Accordingly, enforcement decisions may be made by evaluating options using a multi-variable evaluation. For example, the method 400 might rate all options available to resolve the highest priority bottleneck on the basis of a best fit (i.e. an option which will not spawn an even higher priority bottleneck). Once a best fit is identified in which no resources are overtaxed, the option may be implemented by the method 400.

Once the policy has been enforced (blocks 410, 412) the method 400 may then return to block 402 and resume continuously monitoring the resources of the environment 300.

Policy Evaluation Method

Figure 5:
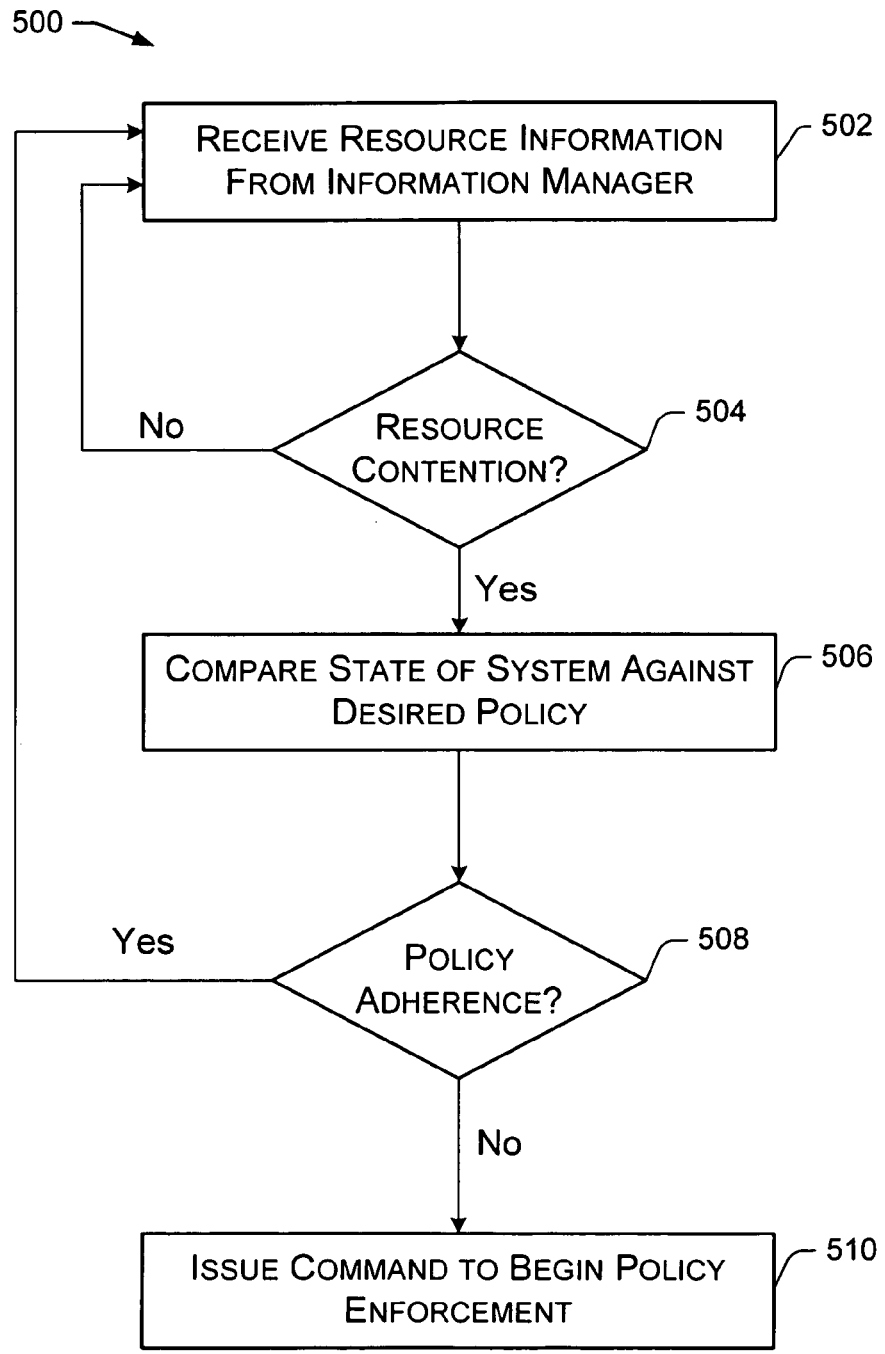
FIG. 5 is a flow diagram illustrating a methodological implementation of a policy evaluator to evaluate current network resource characteristics against a desired policy.

Another aspect of evaluating the desired policy is shown in FIG. 5, which illustrates an exemplary method 500 performed by the policy evaluator 314 residing at the entertainment server 112. For ease of understanding, the method 500 is delineated as separate steps represented as independent blocks in FIG. 5; however, these separately delineated steps should not be construed as necessarily order dependent in their performance. Additionally, for discussion purposes, the method 500 is described with reference to elements in FIGS. 1-3.

Once usage information regarding the usage of the resources of architecture 300 has been collected, it may be analyzed to see if resource contention issues exist (block 502). In one exemplary implementation, the usage data is collected by the information manager 312. The usage data may be analyzed by comparing it to total available resources in the architecture 300. For example, the data collected by the information manager 312 concerning the total usage of the network 124 may be viewed against the total available capacity of the network 124 to see if the network 124 is close to saturation. In a similar fashion, the CPU(s), memories, (I/O) interfaces, and hard disks, for entertainment server(s) 112—as well as the network devices 122—may be analyzed for resource contention in order to determine if the CPU(s), memories, (I/O) interfaces, and hard disks are in danger of becoming oversaturated.

If no conflicts exist, and there is no danger of over saturation of any of the resources of architecture 300 (i.e. the "no" branch from block 504) then no intervention is necessary, and the method 500 returns to block 502. Alternately, however, if any of the resources are found to be close to saturation (i.e. the "yes" branch from block 504), the method 500 will check the current state of the architecture 300 against a desired policy in order to determine whether the current state of the architecture 300 matches that which is mandated under the desired policy (block 506).

Desired policies may, for example, be pre-entered by users, preset by manufacturers or other entities in the distribution chain from manufacturer to user, or set and reset during operation of the architecture 300. In one implementation, a desired policy might mandate a flawless or high quality experience for the first (chronological) user of the architecture 300 while degrading the experience for subsequent users. Potentially, such a desired policy might include refusing service to a last user whose use might lead to resource contention. In another possible implementation, a desired policy might mandate a flawless or high quality experience for a user of primary user (such as a parent or an owner of an entertainment server 112) and degrade the experience for lower priority users (e.g. children and non owners of an entertainment server 112). Such a policy could potentially include refusing service to a lowest priority user whose use might lead to resource contention.

In yet another possible implementation, a desired policy might mandate a flawless or high quality user experience for the highest quality display (e.g. a HDTV monitor) and degrade the experience for lower quality displays (e.g. the SDTV monitors). Alternately the policy could mandate delivering HD content only to HD displays, and SD content to all other displays.

In still another possible implementation, a desired policy might mandate the degradation of all users experiences equally, such that all users share the resources of architecture 300, as well as the degradation of the resources of architecture 300, fairly.

In all of the implementations above, desired policies might also contain provisions to punish or contain high volume users. For example, any users or devices consuming a disproportional percentage of the resources of the architecture 300 could be subjected to special treatment, including degradation of user experience, or preclusion from further use of the resources of architecture 300.

The state of the architecture 300 may be compared to the desired policy in order to see if a desired outcome mandated by the desired policy matches the actual state of the architecture 300. If the actual outcome matches the desired outcome, (i.e. the "yes" branch from block 508) then no intervention is necessary, and the method 500 returns to block 502. Alternately, if the actual outcome does not match the desired outcome, (i.e. the "no" branch from block 508) then intervention is necessary, and the method 500 continues to block 510, where a command is given to begin policy enforcement.

Enforcement Method

Figure 6:
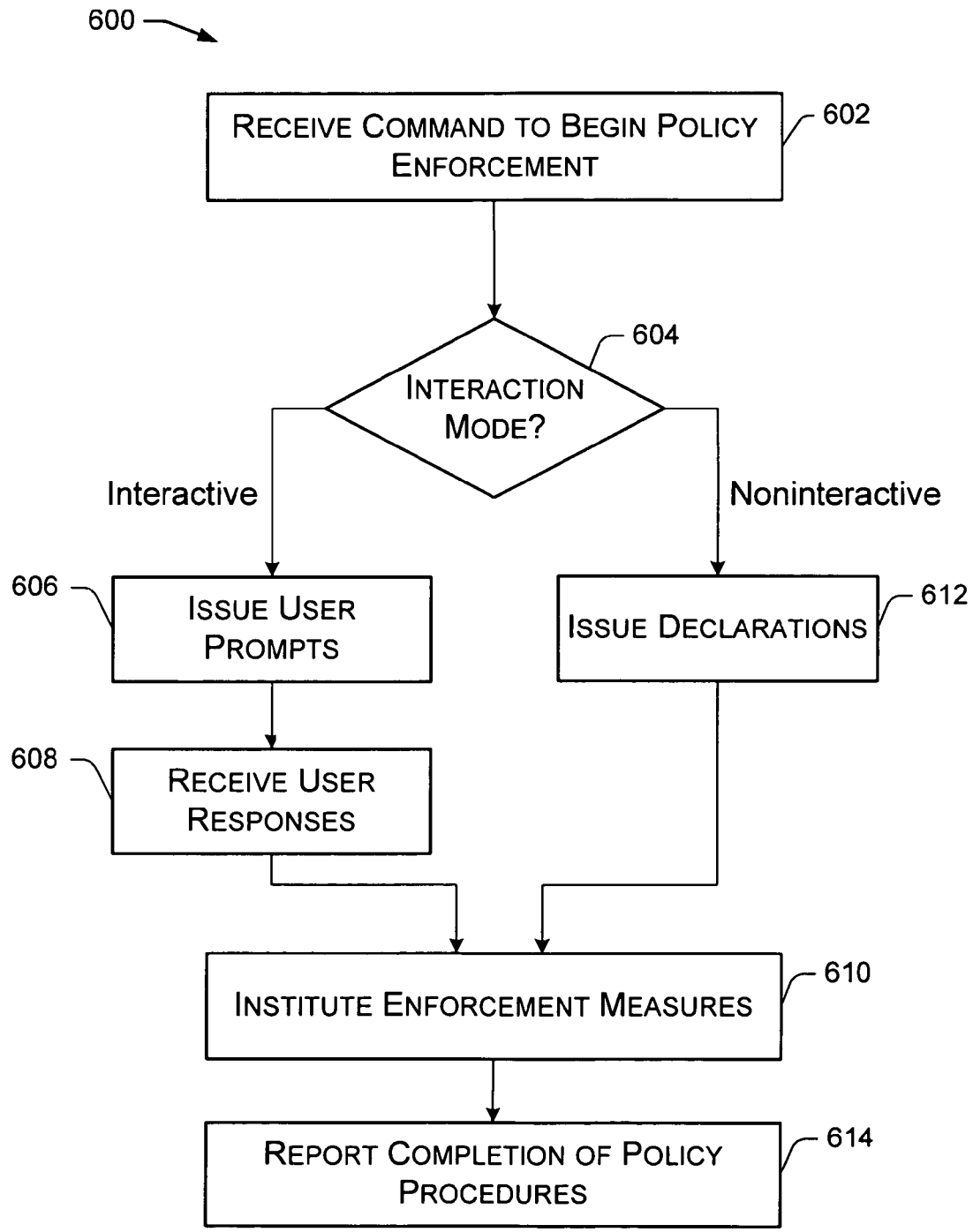
FIG. 6 is a flow diagram illustrating a methodological implementation of an enforcement module to institute changes to network resources in order to bring the network resources into compliance with a desired policy.

Another aspect of evaluating the desired policy is shown in FIG. 6, which illustrates an exemplary method 600 performed by the enforcement module 316 residing at the entertainment server 112. For ease of understanding, the method 600 is delineated as separate steps represented as independent blocks in FIG. 6; however, these separately delineated steps should not be construed as necessarily order dependent in their performance. Additionally, for discussion purposes, the method 600 is described with reference to elements in FIGS. 1-3.

Once the current state of the architecture 300 has been found to be in contrivance of the desired policy, an order may be issued by the media experience policy engine 120, or one of its components, to begin enforcement of the desired policy. Upon receipt of this command (block 602), the method 600 may review the desired policy, other preset settings, or issue a prompt to a user, in order to determine if an interactive or noninteractive enforcement approach should be pursued (block 604).

If an interactive approach is desired (i.e. the "interactive" branch from block 604), the method 600 proceeds to issue one or more user prompts to one or more users in an effort to discontinue or change user or device behavior resulting in resource contention (block 606).

For example, in the event that usage of the network 124 is too high, the method 600 might cause prompts to be displayed on monitors being used by the one or more users with one or more options. In one implementation the one or more users might be given the option of listening to music instead of watching TV since delivery of audio content consumes less bandwidth than the delivery of audio and video content. Additionally, the one or more users might be given the option to switch from an HDTV channel to a SDTV channel in order to decrease the network usage and thus ameliorate the related network resource contention issue.

In another possible implementation, the one or more users could be prompted to join a media experience shared with other users (multicast vs. unicast). Additionally, the one or more users could be prompted to switch to a delayed playback mode. If the media content is being sourced from outside the network 124, such an election would allow the one or more entertainment servers 112 to download and cache the media content in non-real-time before playing it for the one or more users. This option may reduce a network load on a wide area network (WAN) link of the entertainment server 112 (wherein the bandwidth of the WAN might be partially shared with that of network 124). Alternately, if the media content is already stored on the network 124, the device 122 may download and cache the media content, thus reducing a network load on the network 124.

In addition, the one or more users could be presented with the choice of allowing a reduction in bit-rate of media content to be delivered to them through use of a transrater/transcoder. Moreover, the one or more users could be presented with the option of having the media encoder bit-rate reduced (if the source is being encoded in real-time). Additionally, the one or more users could be given the option of switching to a different bit-rate and/or format in a multi-bit-rate/multi-format media file. In yet another example, the one or more users could be given the option of enabling network prioritization (e.g. WiFi Multimedia) to ensure that the most important streams of media content being delivered from the one or more entertainment servers 112 to the home network devices 122 are not degraded (which in turn means that streams of lesser importance might be degraded). Alternately, the one or more users could be prompted to reduce the fidelity of the UI experience (if it is driven from the one or more entertainment servers 112 or the home network devices 122) from a rich experience to a flat experience.

Similarly, in the event that usage of the memory 308, 320 in the one or more entertainment servers 112 or home network devices 122 is too high, method 600 might present the one or more users with one or more of several options designed to decrease memory usage. In one exemplary implementation, the one or more users might be presented with the option of switching to viewing non-digital rights management (DRM) protected media content, such as switching television channels from a pay channel such as a Home Box Office® TV channel, to a publicly available channel such as an American Broadcasting Company TV channel. This action may decrease memory requirements by vitiating the need to load encryption/decryption or policy manager components on the memory 308, 320 of one or more entertainment servers 112 and home network devices 122.

In the event that CPU usage on the one or more entertainment servers 112 or home network devices 122 is too high, the one or more users may be prompted to take appropriate actions to decrease CPU usage. For example, the one or more users may be prompted to switch to viewing non-DRM protected media content in order to eliminate the encryption/decryption and policy manager overhead associated with DRM content. Similarly, the one or more users may be prompted to switch from an HD feed to an SD feed (for example, from an HDTV channel to an SDTV channel).

In the event that hard disk usage on the one or more entertainment servers 112 or home network devices 122 is too high, the one or more users may be prompted to take appropriate actions to decrease hard disk usage. For example, the one or more users may be prompted to switch to a lower bandwidth stream (e.g. music instead of television, SDTV instead of HDTV).

In one implementation, only user(s) whose user experience will be affected by mandates from the desired policy will be presented with enforcement options. It is also possible, however that nonaffected users could also receive notifications of the resource contention issue as well as the possible solutions available.

In the event that a bottleneck in encountered at, for example, an (I/O) interface, another option that can be employed is the use of load balancing between multiple entertainment servers 112 or home network devices 122. In such case, the one or more users could be prompted to allow the stand alone media experience policy engine 204 and/or the media experience policy engines 120, 202 from entertainment servers 112 and home network devices 122 to collaborate and dynamically shift the load from one of the entertainment servers 112 or network devices 122 to another. Alternately, one "primary" policy engine 120, 202 on one of the entertainment servers 112 or home network devices 122—or the stand alone media experience policy engine 204—could collect feedback from all entertainment servers 112 and home network devices 122 and act on it to decrease and ultimately ameliorate the bottleneck.

Once the one or more users to whom these prompts are issued enter their responses (block 608), the method 600 may institute the changes in order to effect the desired policy (block 610). It will be understood, that one implementation could include issuing prompts to high priority users, enabling them to make choices, and thus decide the fates of lower priority users.

In the case of non-interactive enforcement (i.e. the "non-interactive" branch from block 604), the method 600 may proceed to implement changes to the environment 300 without prompting any users. The method 600 may provide an explanation or description of ensuing changes to affected users, nonaffected users, or any subsets thereof, before or while the changes are being instituted (block 612), however this need not be done. For example the method may directly institute appropriate enforcement measures (block 610) without issuing any warnings to any users.

It will be understood that the actions that can be taken by the method 600 to institute the enforcement measures using noninteractive enforcement may include all of those measures discussed above in conjunction with interactive enforcement. In addition, in one exemplary implementation of noninteractive enforcement, if usage of memory 308, 320 is found to be too high on the one or more entertainment servers 112 or home network devices 122, components not in use could be automatically unloaded.

It will also be understood that other techniques can be used in addition to those mentioned above. Moreover, the techniques above may be mixed and matched, multiple approaches could be employed together. Moreover, combinations of both interactive and non-interactive enforcement techniques could be employed.

It will also be understood that most changes mentioned above necessarily incur expenses. For example, when a high bit-rate stream is dynamically transrated/transcoded, quality or a user experience is reduced and increased CPU usage or an entertainment server or home network device 122 is increased. Accordingly, the method 600 could evaluate possible enforcement options using a multi-variable evaluation. For example the method 600 may identify all options that would resolve the highest priority bottleneck and rate the options in order to find the best fit (i.e. the one that does not spawn an even higher priority bottleneck). Once a best fit is identified in which no resources are overtaxed, the option may be implemented.

Once the appropriate enforcement measures have been implemented (block 610) the method 600 may issue a report to one or more media experience policy engines 120, one or more client side MEPEs 202, the stand alone media experience policy engine 204, or to other applications on the entertainment servers 112 or home network devices 122 reporting completion of the procedures chosen to bring the architecture 300 in line with the desired policy (block 614). Such a report need not be issued however,

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-executable method, comprising:
monitoring resource usage levels of resources on an entertainment server, a network, and a plurality of network devices, as the entertainment server delivers media content to the one or more network devices via the network;
determining, based on a desired policy, if one or more of the resource usage levels present a potential for resource contention on one or more of the resources on the entertainment server, the network, and the plurality of network devices; and
if the potential for resource contention exists:
transmitting a prompt to a high priority user at one of the plurality of network devices, the prompt extending the high priority user an opportunity to choose from one or more possible actions that can be taken to alter a user experience of a lower priority user at a second one of the plurality of network devices to avoid resource contention;
changing delivery options of media content from the entertainment server to the lower priority user at the second one of the plurality of network devices in accordance with a possible action chosen by the high priority user to avoid media rendering disruptions that might otherwise result from resource contention; and
mandating a highest quality user experience for a network device of the plurality of network devices having a highest quality display and degrading a quality for network devices having lower quality displays; and
generating and issuing a report to the entertainment server, the network, and the plurality of network devices that confirms completion of the transmitting a prompt, the changing delivery options, and the mandating a highest quality user experience.

2. The method of claim 1, wherein the monitoring comprises at least one of: collecting data regarding usage of a CPU, collecting data regarding usage of a memory, collecting data regarding usage of a hard disk, collecting data regarding usage of an I/O interface.

3. The method of claim 1, wherein the changing delivery options comprises rendering non DRM media content in the place of DRM protected media content.

4. The method of claim 1, wherein the changing delivery options comprises switching from audio/video content to audio content.

5. The method of claim 1, wherein the changing delivery options comprises downloading and caching streamed media content for delayed delivery.

6. The method of claim 1, wherein the one or more possible actions are presented to the high priority user in plain English.

7. The method of claim 1, wherein changing delivery options comprises switching from an HD channel to an SD channel.

8. A computer-readable storage medium having computer-readable instructions stored thereon that, when executed, causes one or more processors to perform acts comprising:
monitoring a current state of an entertainment server delivering media content to one or more current users;
determining if the current state represents a potential for resource contention among resources on the entertainment server; and
issuing instructions to the entertainment server to deliver media content to the one or more current users in accordance with a predetermined desired policy to reduce resource usage and avoid resource contention,
wherein if the potential for resource contention exists, the issuing the instructions to the entertainment server comprise:
transmitting a prompt to a high priority user at one of a plurality of network devices, the prompt extending the high priority user an opportunity to choose from one or more possible actions that can be taken to alter a user experience of a lower priority user at a second one of the plurality of network devices to avoid resource contention;
changing delivery options of media content from the entertainment server to the lower priority user at the second one of the one or more plurality of network devices in accordance with a possible action chosen by the high priority user to avoid media rendering disruptions that might otherwise result from resource contention; and
mandating a highest quality user experience for a network device of the plurality of network devices having a highest quality display and degrading a quality for network devices having lower quality displays; and generating and issuing a report to the entertainment server and the plurality of network devices that confirms completion of the transmitting a prompt, the changing delivery options, and the mandating a highest quality user experience.

9. The computer-readable storage medium of claim 8, wherein monitoring a current state of an entertainment server comprises collecting data on at least one of: total usage of a CPU, total usage of a CPU by a specified user, total usage of a CPU by a specified device, total usage of the entertainment server's memory, total usage of the entertainment server's memory by a specified user, total usage of the entertainment server's memory by a specified device, total usage of the entertainment server's hard disk, total usage of the entertainment server's hard disk by a specified user, total usage of the entertainment server's hard disk by a specified device, total usage of an I/O interface hard disk, total usage of an I/O interface by a specified user, and total usage of an I/O interface by a specified device.

10. The computer-readable storage medium of claim 8, wherein the predetermined policy comprises instructions to maintain a highest quality user experience to a first chronological user, and to degrade the user experiences of later chronological users.

11. The computer-readable storage medium of claim 8 further including instructions stored thereon, that when executed, causes one or more processors to perform additional acts comprising:

detecting a current user who is consuming a disproportionate percentage of the resources; and issuing instructions to the entertainment server to deliver media content to the current user who is using a disproportionate percentage of the resources in accordance with the predetermined policy to reduce resource usage and avoid resource contention by one or more of:

precluding the user who is using a disproportionate percentage of the resources from further use of the resources;

degrading a user experience of the user who is using a disproportionate percentage of the resources.

* * * * *